US012766478B2

(12) United States Patent
Kong et al.

(10) Patent No.: US 12,766,478 B2
(45) Date of Patent: Oct. 20, 2026

(54) SOLAR-DRIVEN METHANOL REFORMING SYSTEM FOR HYDROGEN PRODUCTION

(71) Applicant: JIANGSU UNIVERSITY OF SCIENCE AND TECHNOLOGY, Zhenjiang (CN)

(72) Inventors: Wei Kong, Zhenjiang (CN); Heping Shao, Zhenjiang (CN); Yang Sun, Zhenjiang (CN); Leitao Han, Zhenjiang (CN); Yanni Gu, Zhenjiang (CN)

(73) Assignee: JIANGSU UNIVERSITY OF SCIENCE AND TECHNOLOGY, Zhenjiang (CN)

( * ) Notice: Subject to any disclaimer, the term of this patent is extended or adjusted under 35 U.S.C. 154(b) by 725 days.

(21) Appl. No.: 18/344,917

(22) Filed: Jun. 30, 2023

(65) Prior Publication Data

US 2023/0339748 A1 Oct. 26, 2023

Related U.S. Application Data

(63) Continuation of application No. PCT/CN2022/106934, filed on Jul. 21, 2022.

(51) Int. Cl.
*B01J 15/00* (2006.01)
*B01J 4/00* (2006.01)
(Continued)

(52) U.S. Cl.
CPC ............ *B01J 15/005* (2013.01); *B01J 4/004* (2013.01); *B01J 19/127* (2013.01);
(Continued)

(58) Field of Classification Search
CPC .... B01J 15/005; B01J 19/127; B01J 19/2435; B01J 19/248; B01J 19/26; B01J 19/2415; B01J 4/004; B01J 2219/00058; B01J 2219/00081; B01J 2219/00087; B01J 2219/00105; B01J 2219/00144;
(Continued)

(56) References Cited

FOREIGN PATENT DOCUMENTS

CN 101289164 A * 10/2008
CN 104425831 A * 3/2015 .......... H01M 8/0618
CN 110467154 A * 11/2019 ............ B01J 19/127

OTHER PUBLICATIONS

Machine Translation of CN 101289164 (Year: 2008).*
Machine Translation of CN 104425831 (Year: 2015).*
Machine Translation of CN 110467154 (Year: 2019).*

* cited by examiner

*Primary Examiner* — Lessanework Seifu
(74) *Attorney, Agent, or Firm* — CBM PATENT CONSULTING, LLC

(57) ABSTRACT

A solar-driven methanol reforming system for hydrogen production includes a water storage tank, high-temperature solar collector tubes, a thermocouple, valves, preheaters, an evaporator, a reactor, a heat exchanger, a mixed solution (methanol and water) storage tank, a gas separator, a pump, a carbon dioxide storage tank, a hydrogen storage tank, and pipes; the present invention utilizes solar energy to provide heat required for hydrogen production by methanol reforming, and stores some heat in a phase change material to supply heat for the methanol reforming reaction when sunlight is weak; the system does not need additional energy supply, thus saving energy consumption from traditional electric heating or fuel heating.

6 Claims, 7 Drawing Sheets

(51) Int. Cl.

| | |
|---|---|
| ***B01J 19/12*** | (2006.01) |
| ***B01J 19/24*** | (2006.01) |
| ***B01J 19/26*** | (2006.01) |
| ***C01B 3/3231*** | (2026.01) |
| ***C01B 3/38*** | (2006.01) |
| ***C01B 3/501*** | (2026.01) |

(52) U.S. Cl.
CPC ....... *B01J 19/2415* (2013.01); *B01J 19/2435* (2013.01); *B01J 19/248* (2013.01); *B01J 19/26* (2013.01); *C01B 3/3231* (2026.01); *C01B 3/38* (2013.01); *C01B 3/501* (2013.01); *B01J 2219/00058* (2013.01); *B01J 2219/00081* (2013.01); *B01J 2219/00087* (2013.01); *B01J 2219/00105* (2013.01); *B01J 2219/00144* (2013.01); *B01J 2219/00159* (2013.01); *B01J 2219/2428* (2013.01); *B01J 2219/332* (2013.01); *C01B 2203/0233* (2013.01); *C01B 2203/0405* (2013.01); *C01B 2203/0866* (2013.01); *C01B 2203/1223* (2013.01); *C01B 2203/1294* (2013.01); *C01B 2203/1614* (2013.01)

(58) Field of Classification Search
CPC ..... B01J 2219/00159; B01J 2219/2428; C01B 3/38; C01B 3/501; C01B 3/323; C01B 3/3231; C01B 2203/0233; C01B 2203/0405; C01B 2203/0866; C01B 2203/1223; C01B 2203/1614; C01B 2203/0475; C01B 2203/0883; C01B 2203/1294; C01B 2203/0805
See application file for complete search history.

SOLAR-DRIVEN METHANOL REFORMING SYSTEM FOR HYDROGEN PRODUCTION

TECHNICAL FIELD

The present invention relates to the field of methanol hydrogen production, and particularly relates to the field of solar-driven methanol reforming for hydrogen production.

BACKGROUND

In the context of climate change, reduction of energy resources, and air pollution, realization of energy-sustainable, innovative transportation with low-$CO_2$ emissions is particularly important. The transportation industry is an important part of the national economy. However, the high consumption of oil resources and the aggravation of energy and environmental crises require the development of new energy vehicles to solve environmental and energy problems. The development of new energy vehicles is deemed as an effective way to realize the transformation of clean energy, and the development of the new energy vehicle industry is widely expected.

Due to its good combustion performance, high combustion value, high utilization rate, non-toxic and non-polluting properties, and other advantages, hydrogen energy has become one of the fuel choices for new energy vehicles. At present, industrialized hydrogen production technologies mainly include hydrocarbon steam reforming, water electrolysis, methanol reforming, and partial oxidation of heavy oil. However, hydrocarbon steam reforming requires a high temperature (500° C.-850° C.), water electrolysis features high energy consumption and low efficiency, and partial oxidation of heavy oil is characterized by high cost. In contrast, methanol reforming for hydrogen production has the advantages of simple raw materials (only methanol and water are needed), high efficiency, and low requirements for operating temperatures, so that this technology becomes the first choice for hydrogen production.

With the development of fuel cell vehicles, the construction of hydrogen refueling stations has become a key factor restricting the development of fuel cell vehicles. However, due to the difficulty of hydrogen storage and transportation, the construction of hydrogen refueling stations that produce hydrogen by methanol reforming has become a research hotspot today, which aims to avoid the troubles in storage and transportation of hydrogen. The process of hydrogen production by methanol reforming is an endothermic reaction. The traditional method is to burn part of the methanol to provide heat required for hydrogen production by methanol reforming. However, traditional methods reduce the hydrogen production rate of the system, and increase the hydrogen production cost.

SUMMARY

An objective of the present invention is to provide heat required for hydrogen production by solar-driven methanol reforming, so as to improve the hydrogen production rate and reduce the cost of hydrogen production.

The technical solution adopted by the present invention is as follows: water in a water storage tank is pumped to high-temperature solar collector tubes connected in series for continuous heating. When the temperature of water at an outlet of the high-temperature solar collector tube is T1, the optimal range of T1 is 250° C.-300° C. In this case, when valves 51, 52, 56, and 58 are opened, while other valves are closed, water vapor flows into a reactor through a water vapor inlet pipe and then is evenly separated to its branch pipes through a separator. When water vapor flows in the branch pipes, part of the heat in the branch pipes is used for the methanol reforming reaction, and some heat is transferred to a phase change material for storage. The water vapor flows from the branch pipes to a primary confluence unit after heat exchange, then flows from the primary confluence unit to a secondary confluence unit, then flows out of the reactor through a water vapor outlet pipe, and finally flows toward an evaporator. The water vapor flows into the evaporator through the water vapor inlet pipe of the evaporator, and is evenly separated to the branch pipes through the separator after entering the evaporator. When the water vapor flows in the branch pipes, part of the heat in the branch pipes is used to evaporate a mixed solution of methanol and water, and some heat is transferred to the phase change material for storage. The water vapor flows from the branch pipes to the primary confluence unit after heat transfer, then flows from the primary confluence unit to the secondary confluence unit, then flows out of the evaporator through a water vapor outlet pipe, and finally flows toward a preheater. The water vapor flows into the preheater through the water vapor inlet pipe of the preheater, then is pooled in a water vapor inlet transfer unit, and finally is transferred to a heating plate through a plurality of branch pipes from the transfer unit. After flow in the heating plate in a S-shaped loop with a gradient distance, the water vapor flows from the plurality of branch pipes to a water vapor outlet confluence unit, then flows out of the preheater through the water vapor outlet pipe connected to the confluence unit, and finally flows back to the water storage tank. When the temperature of water at an outlet of the high-temperature solar collector tube is T2, the optimal range of T2 is 100° C.-250° C. In this case, when valves 51, 54, 56, and 57 are opened, while other valves are closed, the water vapor flows back to the water storage tank after passing through the evaporator and the preheater. In addition, when the temperature of water at an outlet of the high-temperature solar collector tube is T3, the optimal range of T3 is 50° C.-100° C. In this case, when valves 53 and 55 are opened, while the other valves are closed, the water vapor only flows back to the water storage tank after passing through the preheater. Furthermore, when the temperature of water at an outlet of the high-temperature solar collector tube is T4, the optimal range of T4 is below 50° C., and in this case, no valve will be opened.

The mixed solution of methanol and water is pumped to a heat exchanger, and after heat exchange with a mixed gas of hydrogen and carbon dioxide generated after the methanol reforming reaction, flows into the preheater through a mixed solution inlet pipe of the preheater. The mixed solution flowing into the preheater is first pooled in a mixed solution inlet transfer unit, and then the mixed solution in the transfer unit is transported to a mixed solution flow channel plate through the plurality of branch pipes. After flow in the mixed solution flow channel plate in a S-shaped loop with a gradient distance, the mixed solution is pooled from the plurality of branch pipes to a mixed solution outlet confluence unit, flows out of the mixed solution outlet pipe connected to the mixed solution outlet confluence unit, and then flows to the evaporator. The preheated mixed solution flows into the evaporator through a mixed solution inlet pipe, and then is ejected from a spray nozzle. The ejected mixed solution is vaporized upon exposure to the branch pipes heated in the evaporator and the phase change material subjected to heat storage, and then the mixed solution gas flows out of the evaporator from a gas outlet pipe after converging through a gas confluence chamber installed at the upper part of the evaporator, and then flows to the reactor. The mixed solution gas enters the reactor from a gas inlet pipe of the reactor, and moves downward after being evenly diffused through a porous medium plate in a gas diffusion chamber at the upper part of the reactor. When the mixed solution gas is exposed to a catalyst covering the surfaces of the branch pipes and the phase change material, methanol reforming reaction occurs, followed by generation of hydrogen and carbon dioxide. Subsequently, hydrogen and carbon dioxide move downwards, flow out of the reactor through the gas outlet pipe after passing through the confluence chamber at the bottom of the reactor, and then flow to a gas separator. The mixed gas of hydrogen and carbon dioxide enters the gas separator through a gas inlet pipe of the gas separator, and is separated when passing through a gas separation membrane connecting the gas inlet pipe and a carbon dioxide outlet pipe. After being separated from the gas separation membrane, hydrogen flows into a hydrogen storage tank from a hydrogen outlet pipe on a side surface of the gas separator. After continued flow inside the gas separation membrane, carbon dioxide that cannot penetrate the gas separation membrane flows from the carbon dioxide outlet pipe to a carbon dioxide storage tank.

Different valves are opened based on the temperature of water at an outlet of the high-temperature solar collector tube. When the optimal range of the temperature T1 is 250° C.-300° C., valves 51, 52, 56, and 58 are opened, while other valves are closed. When the optimal range of the temperature T2 is 100° C.-250° C., valves 51, 54, 56, and 57 are opened, while other valves are closed. When the optimal range of the temperature T3 is 50° C.-100° C., valves 53 and 55 are opened, while other valves are closed. When the optimal range of the temperature T4 is below 50° C., no valve will be opened. Classified utilization of solar energy is realized under different lighting conditions.

The reactor includes a gas diffusion chamber containing a plurality of porous medium plates, a gas confluence chamber, a separator, a plurality of branch pipes, a primary confluence unit, and a secondary confluence unit. The outer surface of each of the branch pipes is covered with a phase change material at certain intervals, the melting point of the phase change material is T1, and the outer surface of the branch pipe without the phase change material and the surface of the phase change material are covered with catalyst coatings. When water vapor flows in the branch pipes, part of the heat in the branch pipes is used for the methanol reforming reaction, and some heat is transferred to a phase change material for storage. Under different lighting conditions, sufficient heat can be provided for the methanol reforming reaction, to ensure the normal reaction.

The evaporator includes a gas confluence chamber, a separator, a plurality of branch pipes, a plurality of spray nozzles, a primary confluence unit, and a secondary confluence unit. The outer surface of each of the branch pipes is covered with a phase change material at certain intervals, and the melting point of the phase change material is T2. The mixed solution of methanol and water is atomized by means of a spray nozzle, resulting in faster evaporation.

The preheater includes a transfer unit, a confluence unit, branch pipes, heating plates, mixed solution (methanol and water) flow channel plates, fins, and a phase change material, and the melting point of the phase change material selected is T3.

The flow channels of the heating plate and the mixed solution (methanol and water) flow channel plate in the preheater are S-shaped with a gradient distance, that is, from the inlet to the outlet of a flow channel, the contact area between the fluid in the flow channel and a flow channel wall continuously increases, and the heat exchange efficiency is further improved, thus avoiding the problem that the heat exchange efficiency continuously declines due to the continuous temperature rise of the mixed solution of methanol and water from the inlet to the outlet of the flow channel. The heating plates and the mixed solution flow channel plates are alternately placed, and fins and phase change materials are placed between them, and also outside the outermost two plates.

The gas confluence chamber and the gas diffusion chamber in the evaporator and the reactor are funnel-shaped or in other shapes with tapered openings.

The evaporator and the reactor adopt a gradual two-stage separator to ensure more uniform distribution of water vapor in each branch pipe.

A mixed gas inlet pipe and the carbon dioxide outlet pipe of the gas separator are connected by the gas separation membrane, the gas separation is completed by means of the gas separation membrane, the hydrogen outlet pipe on a side surface of the separator is connected to the hydrogen storage tank, and a carbon dioxide gas outlet pipe is connected to the carbon dioxide storage tank.

Compared with the prior art, the present invention has the following advantages and beneficial effects:

The present invention utilizes solar energy to provide heat required for hydrogen production by methanol reforming, and stores some heat in a phase change material to supply heat for the system when sunlight is weak. The system does not need additional energy supply.

The present invention selects phase change thermal storage materials with different phase change temperatures according to different temperature requirements for preheating, evaporation, and reforming, thereby meeting different heat exchange requirements.

The evaporator and the reactor designed by the present invention adopt a gradual two-stage separator to ensure more uniform distribution of water vapor in each branch pipe.

The flow channels of the preheater designed by the present invention are S-shaped with a gradient distance, which improves the heat exchange efficiency at a hot end. Fins are arranged between the mixed solution flow channel plate and the heating plate to strengthen the heat exchange between the flow channel plate and the heating plate, between the flow channel plate and the phase change material, and between the heating plate and the phase change material.

The gas separator designed by the present invention separates hydrogen and carbon dioxide through a membrane. Compared to the traditional pressurized liquefaction separation method and the chemical separation method, the membrane separation structure has lower requirements, but is more efficient in separation.

DETAILED DESCRIPTION OF THE EMBODIMENTS

Figure 1:
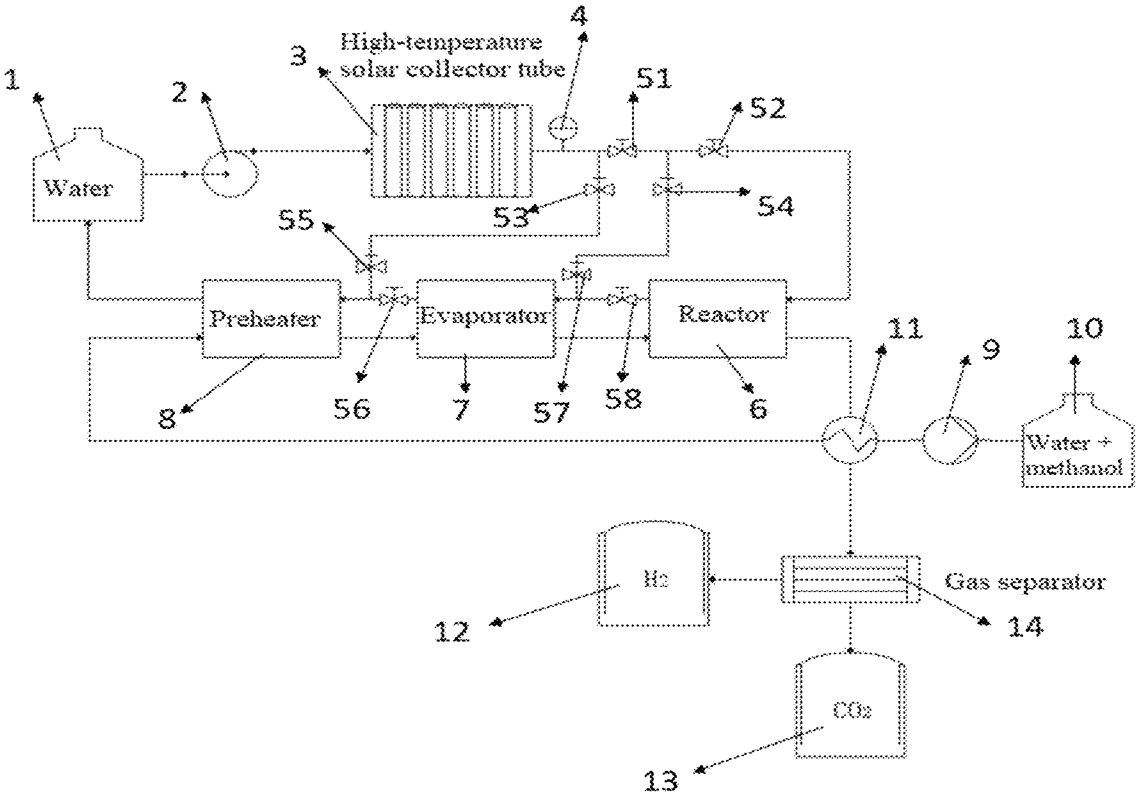
FIG. 1 is a schematic diagram of system composition of the present invention.
Figure 2:
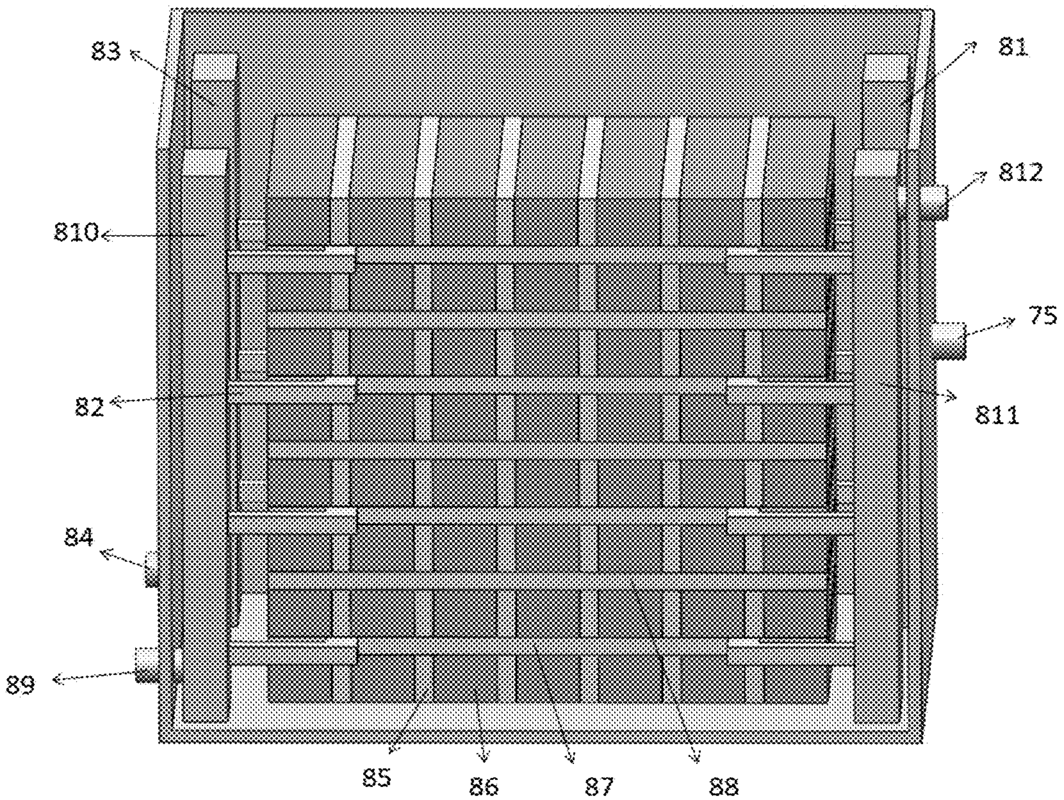
FIG. 2 is a schematic diagram of the structure of a preheater.
Figure 3:
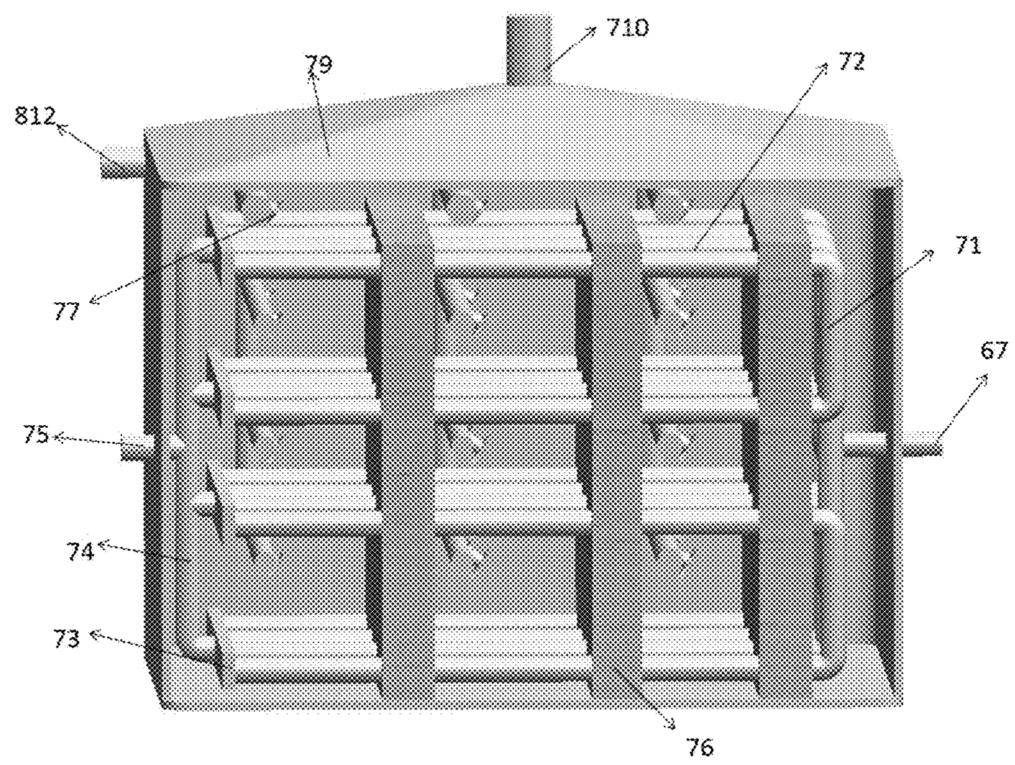
FIG. 3 is a schematic diagram of the structure of an evaporator.
Figure 4:
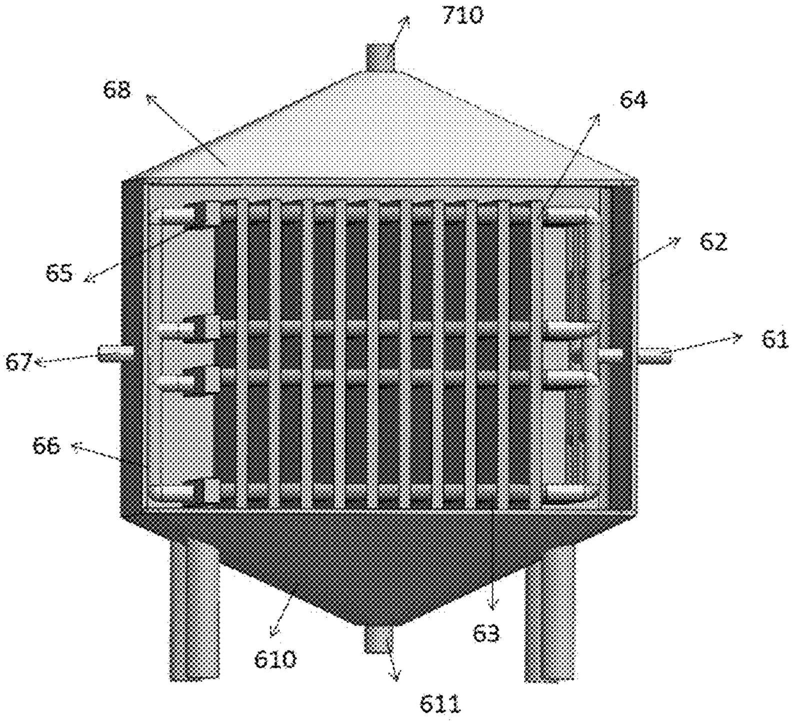
FIG. 4 is a schematic diagram of the structure of a reactor.
Figure 5:
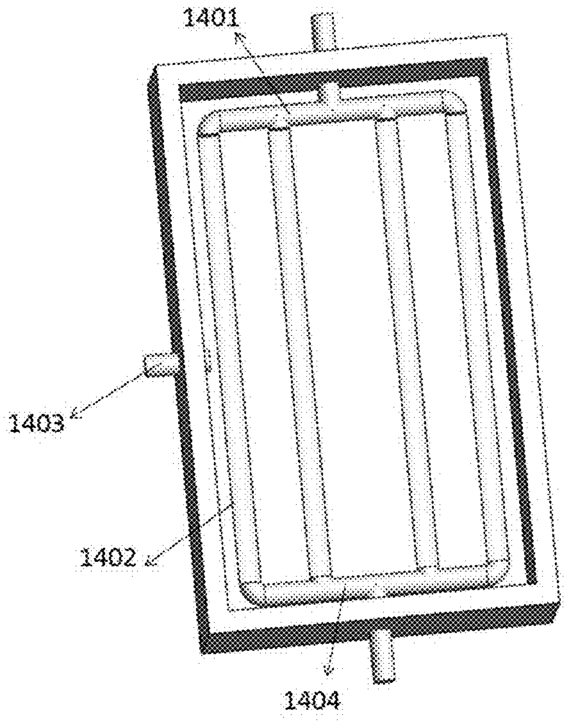
FIG. 5 is a schematic diagram of the structure of a gas separator.
Figure 6:
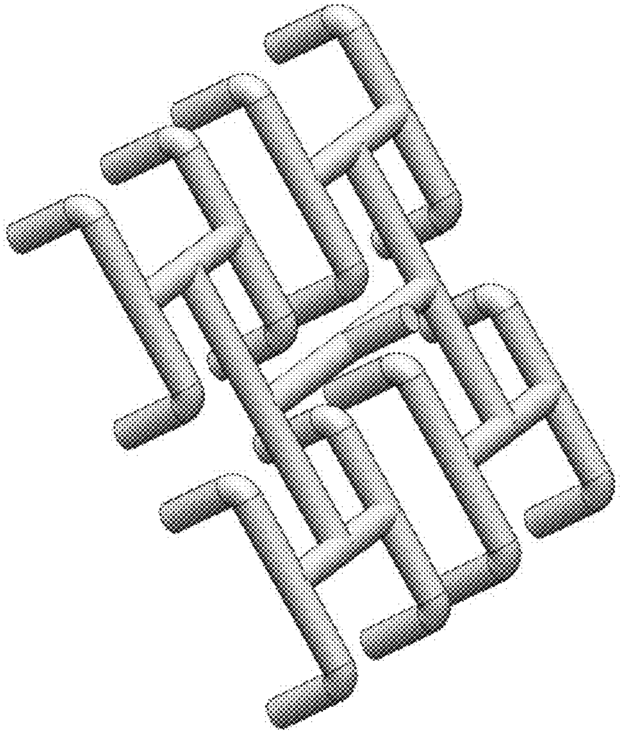
FIG. 6 is a schematic diagram of the structure of a separator.
Figure 7:
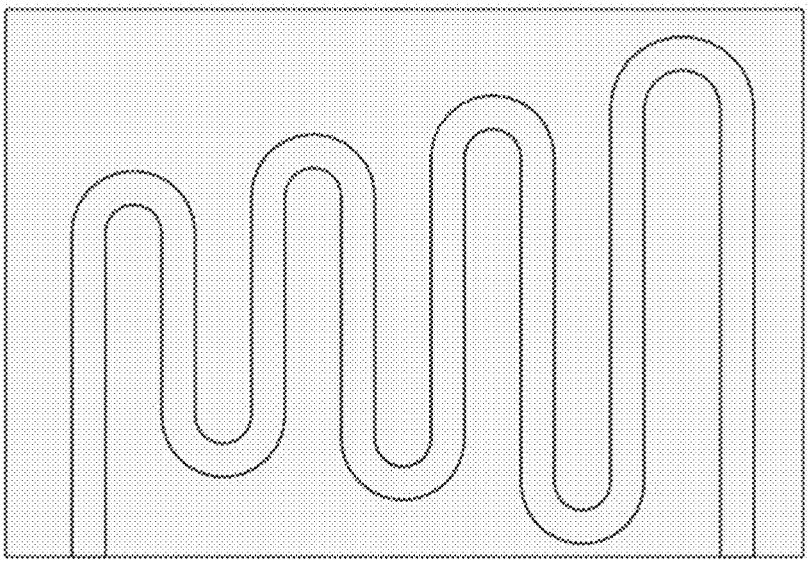
FIG. 7 is a schematic diagram of the structure of a S-shaped flow channel with a gradient distance.
Figure 8:
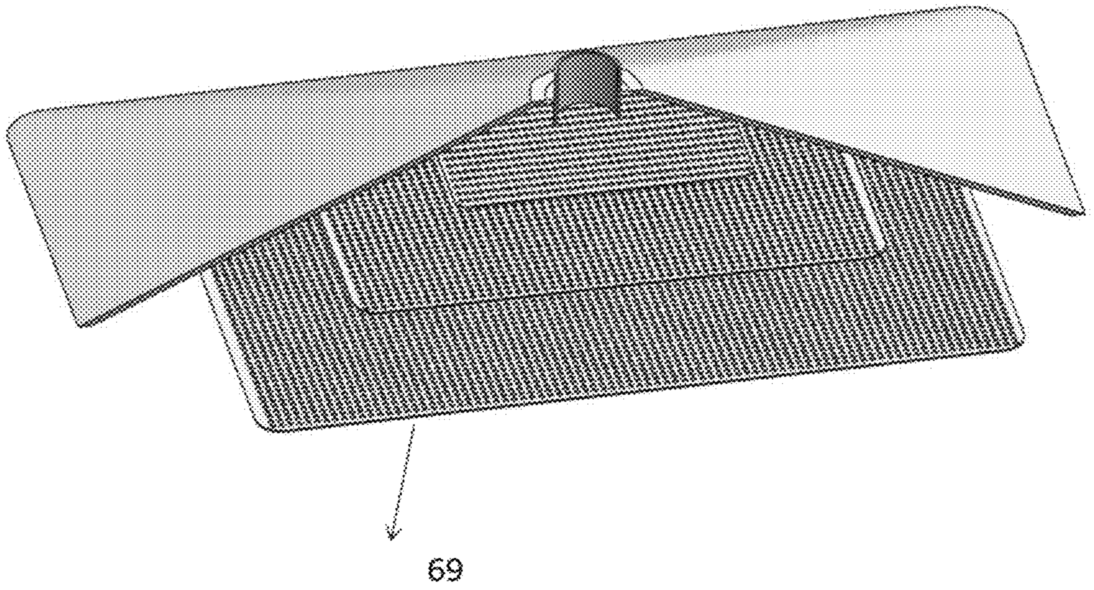
FIG. 8 is a schematic diagram of the structure of a gas diffusion chamber.

Through a pump 2, water in a water storage tank 1 is transferred to high-temperature solar collector tubes 3 connected in series for continuous heating. The system opens different valves according to the temperature of water at an outlet of the high-temperature solar collector tube detected by a thermocouple 4. When the optimal range of the detected temperature T1 is 250° C.-300° C., valves 51, 53, 56, and 58 are opened, while other valves are closed. Water vapor flows into a reactor 6 through a pipe 61 and is evenly separated to a branch pipe 63 through a separator 62. After being transferred to the branch pipe 63 and a phase change material 64, some heat is accumulated in a primary confluence unit 65 and a secondary confluence unit 66 in succession, flows out of a reactor 6 from a pipe 67 and then flows to an evaporator 7. Water vapor flows into the evaporator 7 through the pipe 67 and is evenly separated to a branch pipe 72 through a separator 71. After being transferred to the branch pipe 72 and a phase change material 76, some heat is accumulated in a primary confluence unit 73 and a secondary confluence unit 74 in succession, flows out of the evaporator from a pipe 75 and then flows to a preheater 6. Water vapor flows into a transfer unit 81 in the preheater 6 from the pipe 75, and then the water vapor in the transfer unit 81 is transferred to a heating plate 88 through a branch pipe 82. After flow in the heating plate 88 in a S-shaped loop with a gradient distance, the water vapor is transferred to a confluence unit 83 through the branch pipe 82, then flows out of a preheater 8 through a pipe 84, and finally flows back to the water storage tank 1. When the optimal range of the detected temperature T2 is 200° C.-300° C., valves 51, 52, 56, and 57 are opened, while other valves are closed, and in this case, water vapor returns to the water storage tank 1 after flowing through the evaporator 7 and the preheater 6. When the optimal range of the detected temperature T3 is 100° C.-200° C., valves 54 and 55 are opened, while other valves are closed, and in this case, water vapor returns to the water storage tank 1 after flowing through the preheater 8. When the optimal range of the detected temperature T4 is below 50° C., no valve will be opened.

The mixed solution in a mixed solution (methanol and water) storage tank 10 is transferred to a heat exchanger 11 through a pump 9. After heat exchange with the mixed gas of hydrogen and carbon dioxide generated by the methanol reforming reaction in the heat exchanger 11, the mixed solution flows into the preheater 8 through a pipe 89. Then, through the branch pipe 82, the mixed solution in the transfer unit is transferred to a mixed solution flow channel plate 87. After flow in the mixed solution flow channel plate 87 in a S-shaped loop with a gradient distance, the mixed solution is pooled in a confluence unit 811 through the branch pipe 82, then flows out of the preheater from a pipe 812, and flows to the evaporator 7. After flowing into the evaporator 7 through the pipe 812, the preheated mixed solution is ejected from a spray nozzle 77, and is vaporized upon exposure to the branch pipe 72 heated and the phase change material 76 subjected to heat storage. After confluence in a gas confluence chamber 79, the mixed solution gas flows out of the evaporator 7 through a pipe 710 and then flows to the reactor 6. The mixed solution gas flowing into the reactor 6 moves downward after being evenly diffused by means of a porous medium plate 69 in a gas diffusion chamber 68. When the mixed solution gas is exposed to a catalyst covering the surfaces of the branch pipe 63 and the phase change material 64, methanol reforming reaction occurs, followed by generation of hydrogen and carbon dioxide. The mixed gas of hydrogen and carbon dioxide moves downwards, flows out of the reactor 6 through a pipe 611 after confluence in a confluence chamber 610, and then flows to the heat exchanger 11. After heat exchange with the mixed solution of methanol and water in the heat exchanger 11, the mixed gas flows to a gas separator 14. The mixed gas flows into the gas separator through a pipe 1401 and is separated when passing through a gas separation membrane 1402. Hydrogen is separated outside the membrane and then flows into a hydrogen storage tank 12 through a pipe 1403. Carbon dioxide that cannot penetrate the membrane continues to move inside the membrane, and finally flows into a carbon dioxide storage tank 13 through a pipe 1404.

The present invention utilizes solar energy to provide heat required for hydrogen production by methanol reforming, and stores some heat in a phase change material to supply heat for the methanol reforming reaction when sunlight is weak. The system does not need additional energy supply, thus saving energy consumption from traditional electric heating or fuel heating. The hydrogen produced by means of the system is very pure and can be directly used for hydrogenation of fuel cell vehicles. The separated carbon dioxide can be recycled and reused.

What is claimed is:

1. A solar-driven methanol reforming system for hydrogen production, comprising a water storage tank (1);

a plurality of high-temperature solar collector tubes (3) fluidly connected to the water storage tank (1);

a reactor (6) fluidly connected to the plurality of high-temperature solar collector tubes (3), wherein the reactor (6) comprises a gas diffusion chamber (68) containing a plurality of porous medium plates (69), a gas confluence chamber (610), a separator (62), a plurality of branch pipes (63), a primary confluence unit (65), and a secondary confluence unit (66); an evaporator (7) fluidly connected to the reactor (6);

a preheater (8) fluidly connected to the evaporator (7);

a mixed solution storage tank (10) configured to store a mixed solution of methanol and water;

a heat exchanger (11) fluidly connected to the mixed solution storage tank (10) and the preheater (8);

a gas separator (14) fluidly connected to the heat exchanger (11);

a hydrogen storage tank (12) fluidly connected to the gas separator (14);

a carbon dioxide storage tank (13) fluidly connected to the gas separator (14);

a thermocouple (4) configured to detect a temperature of water at an outlet of the plurality of high-temperature solar collector tubes (3); and a plurality of valves (51-58) and pipes (61, 67, 75, 84, 89, 812, 710, 611, 1401, 1403, 1404) fluidly connecting the components;

wherein an outer surface of each of the plurality of branch pipes (63) in the reactor (6) is covered with a phase change material (64) at certain intervals, a melting point of the phase change material (64) is T1, and the outer surface of each of the plurality of branch pipes (63) without the phase change material (64) and a surface of the phase change material (64) are covered with catalyst coatings.

2. The solar-driven methanol reforming system according to claim 1, wherein the evaporator (7) comprises a gas confluence chamber (79), a separator (71), a plurality of branch pipes (72), a plurality of spray nozzles (77), primary confluence units (73), and secondary confluence units (74); the outer surface of each of the branch pipes (72) is covered with a phase change material (76) at certain intervals, and the melting point of the phase change material (76) is T2; the mixed solution of methanol and water is atomized by means of a spray nozzle (77), resulting in faster evaporation.

3. The solar-driven methanol reforming system according to claim 1, wherein the preheater (8) comprises a transfer unit (81), a confluence unit (83), branch pipes (82), heating plates (88), mixed solution (methanol and water) flow channel plates (87), fins, and a phase change material, and the melting point of the phase change material selected is T3.

4. The solar-driven methanol reforming system according to claim 3, wherein flow channels of the heating plate (88) and the mixed solution (methanol and water) flow channel plate (87) in the preheater (8) are S-shaped with a gradient distance, that is, from an inlet to an outlet of a flow channel, a contact area between fluid in the flow channel and a flow channel wall continuously increases, and heat exchange efficiency is further improved, thus avoiding the problem that the heat exchange efficiency continuously declines due to the continuous temperature rise of the mixed solution of methanol and water from the inlet to the outlet of the flow channel; and the heating plates (88) and the mixed solution flow channel plates (87) are alternately placed, and fins and phase change materials are placed between them, and also outside the outermost two plates.

5. The solar-driven methanol reforming system according to claim 2, wherein the gas confluence chamber (79) and the gas diffusion chamber (68) are funnel-shaped or in other shapes with tapered openings.

6. The solar-driven methanol reforming system according to claim 1, wherein the gas separator (14) includes gas inlet and outlet pipes are connected by a gas separation membrane (1402), the gas separation is completed by means of the gas separation membrane (1402), the pipe on a side surface of the gas separator (14) is connected to a hydrogen storage tank (12), and a gas outlet pipe is connected to a carbon dioxide storage tank (13).

* * * * *